United States Patent [19]
Ray

[11] Patent Number: 6,055,769
[45] Date of Patent: *May 2, 2000

[54] HOLDER FOR FLORAL ARRANGEMENTS

[75] Inventor: James E. Ray, Brantford, Canada

[73] Assignee: Floral Ever Fresh Products Inc., Brantford, Canada

[*] Notice: This patent is subject to a terminal disclaimer.

[21] Appl. No.: 08/942,092

[22] Filed: Oct. 1, 1997

Related U.S. Application Data

[60] Provisional application No. 60/027,751, Oct. 1, 1996.

[51] Int. Cl.$^7$ ........................................................ A01G 5/00
[52] U.S. Cl. .......................................... 47/41.12; 47/41.01
[58] Field of Search ................................. 47/41.01, 41.12

[56] References Cited

U.S. PATENT DOCUMENTS

| | | |
|---|---|---|
| 3,127,698 | 4/1964 | Smithers . |
| 3,962,825 | 6/1976 | O'Connell . |
| 4,058,929 | 11/1977 | O'Connell . |
| 4,858,381 | 8/1989 | Walton et al. ............. 47/41.12 |
| 5,317,832 | 6/1994 | Kollen ..................... 47/41.12 |
| 5,588,253 | 12/1996 | Boodley et al. .......... 47/41.12 |
| 5,693,380 | 12/1997 | O'Connell ................ 47/41.12 |

FOREIGN PATENT DOCUMENTS

| 3099 | 2/1898 | United Kingdom .............. 47/41.01 |
|---|---|---|

*Primary Examiner*—Thomas Price
*Assistant Examiner*—Joanne C. Downs
*Attorney, Agent, or Firm*—R. Craig Armstrong

[57] ABSTRACT

The floral arrangement holder has a base which supports a foam block in contact with the upper surface of the base. Drain holes are provided so that any excess water can run into the hollow base portion. Recessed reservoir channels are provided in the upper surface of the base, to allow any excess water in one portion of the block to flow to a drier portion, and to allow water to wick upwardly into the block from the channels. A filling area extends outwardly from the base for convenient access, and has an upper surface which preferably is angled slightly downwardly towards the channels for better distribution of the water. The filling area also doubles as a convenient hand grip, by virtue of being provided with finger recesses. A clip arrangement holds the foam block in place. An elongated version of the holder holds two such blocks, and includes an extended end portion to provide greater-water storage capacity, particularly useful if the holder is suspended via an apertured tab at the opposite end.

18 Claims, 9 Drawing Sheets

HOLDER FOR FLORAL ARRANGEMENTS

Claims provisional application Ser. No. 60/027,751 filed on Oct. 1, 1996.

BACKGROUND OF THE INVENTION

This invention relates to holders for floral arrangements of the type which are commonly referred to as casket saddles, and which are particularly useful for positioning the floral arrangement on top of a casket. The holders may of course be used for holding floral arrangements for display under any other circumstances as well.

U.S. Pat. No. 3,962,825 (O'Connell) shows a commonly-used casket saddle similar to the one of the present invention. In O'Connell, "a holder for a foam block for supporting flower arrangements comprises a hollow tray-like base member forming a water-confining receptacle for supporting a foam block, the upper wall of such receptacle having one or more apertures for draining excess water from the foam block into the receptacle, and a plurality of elongated fastening members shaped to engage and laterally support the foam block and detachably engageable with the base member".

In O'Connell, the foam block is supported on ridges projecting above the upper surface of the receptacle, which results in water being allowed to drain from the foam block relatively quickly, and which allows the passage of air underneath the block, further tending to dry out the bottom of the block and encourage further drainage from the upper portion of the block. The result is that the block dries out too quickly, and optimum life of the floral arrangement is not achieved. O'Connell's solution to this problem is to add a reservoir above the foam block, which trickles water into the upper surface of the block. However, this adds a complication to the product, and interferes with the floral arrangement.

Another difficulty with O'Connell is that the foam block occupies most of the upper surface of the unit, so it is very difficult to add water, if desired, without spilling some of that water. For the same reason, it is also very difficult to pick up the unit, which makes moving the floral arrangement inconvenient and which increases the likelihood of spillage.

In O'Connell, the use of supporting ridges is said to be for the purpose of overcoming an alleged problem with the device in another earlier patent, namely U.S. Pat. No. 3,127,698 (Smithers). O'Connell says that in Smithers, "there is a tendency to super-saturate the foam block with water, with the result that the excess water accumulates in the open tray which is subject to sloshing about and spilling over its edges during handling of the holder, particularly during delivery by the florist".

SUMMARY OF THE INVENTION

In the invention, the above problems relating to excessive or insufficient moisture of the foam block are solved by not using any ribs or ridges on the upper surface of the tray-like base, so that the foam block is in contact with the upper surface. Drain holes are provided so that any excess water can run into the hollow base portion, thus avoiding the alleged potential spillage problem of Smithers. Furthermore, recessed reservoir channels are provided in the upper surface of the base, to allow any excess water in one portion of the block to flow to a drier portion, and to allow water to wick upwardly into the block from the channels.

Also, a filling area is provided. The filling area extends outwardly from the base for convenient access, and has an upper surface which preferably is angled slightly downwardly towards the channels for better distribution of the water. This filling area makes it very easy for water to be added from time to time, with much less risk of spillage than in the prior art.

The filling area also doubles as a convenient hand grip. Thus preferably the underside of the filling area is provided with four finger recesses, so that a person can conveniently grasp the unit with his or her thumb on top of the filling area, and four fingers in the finger recesses.

BRIEF DESCRIPTION OF THE DRAWINGS

The invention will now be described in greater detail with reference to the accompanying drawings of the preferred embodiment by way of example only, in which.

DETAILED DESCRIPTION OF THE PREFERRED EMBODIMENT

Figure 1:
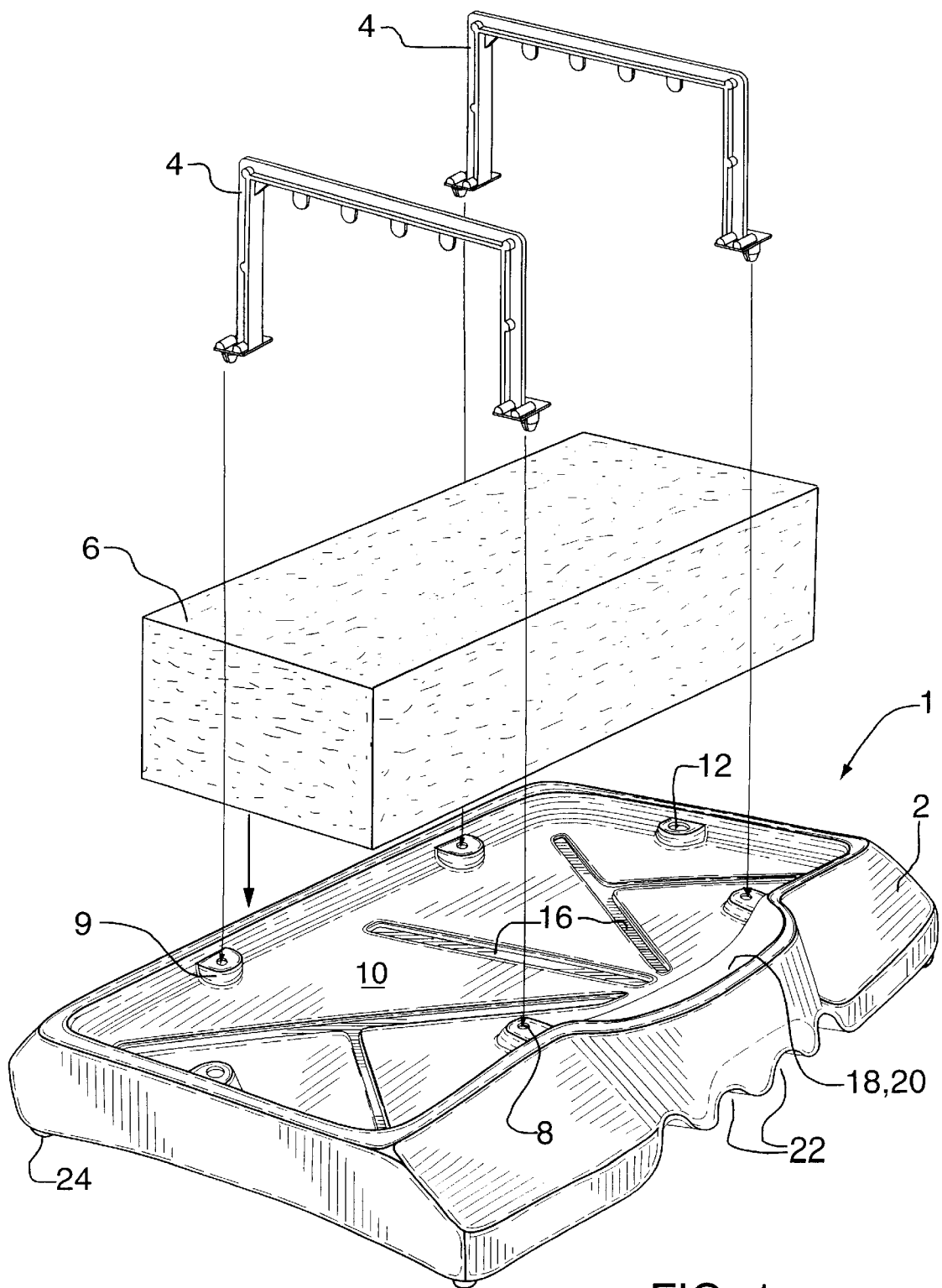
FIG. 1 is an exploded perspective view of the preferred embodiment, including a foam block.
Figure 2:
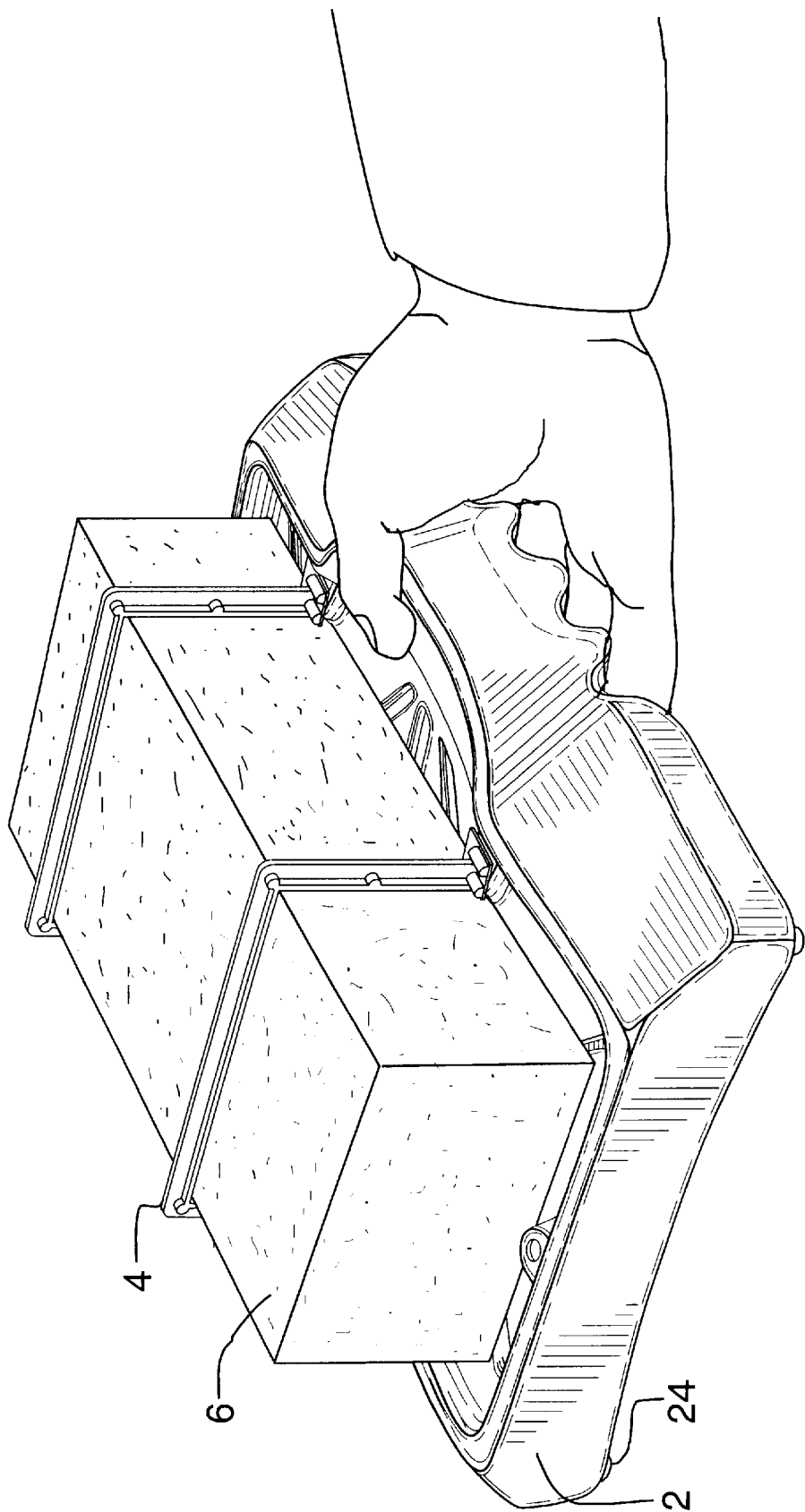
FIG. 2 is a perspective view of the preferred embodiment, again including the foam block.
Figure 3:
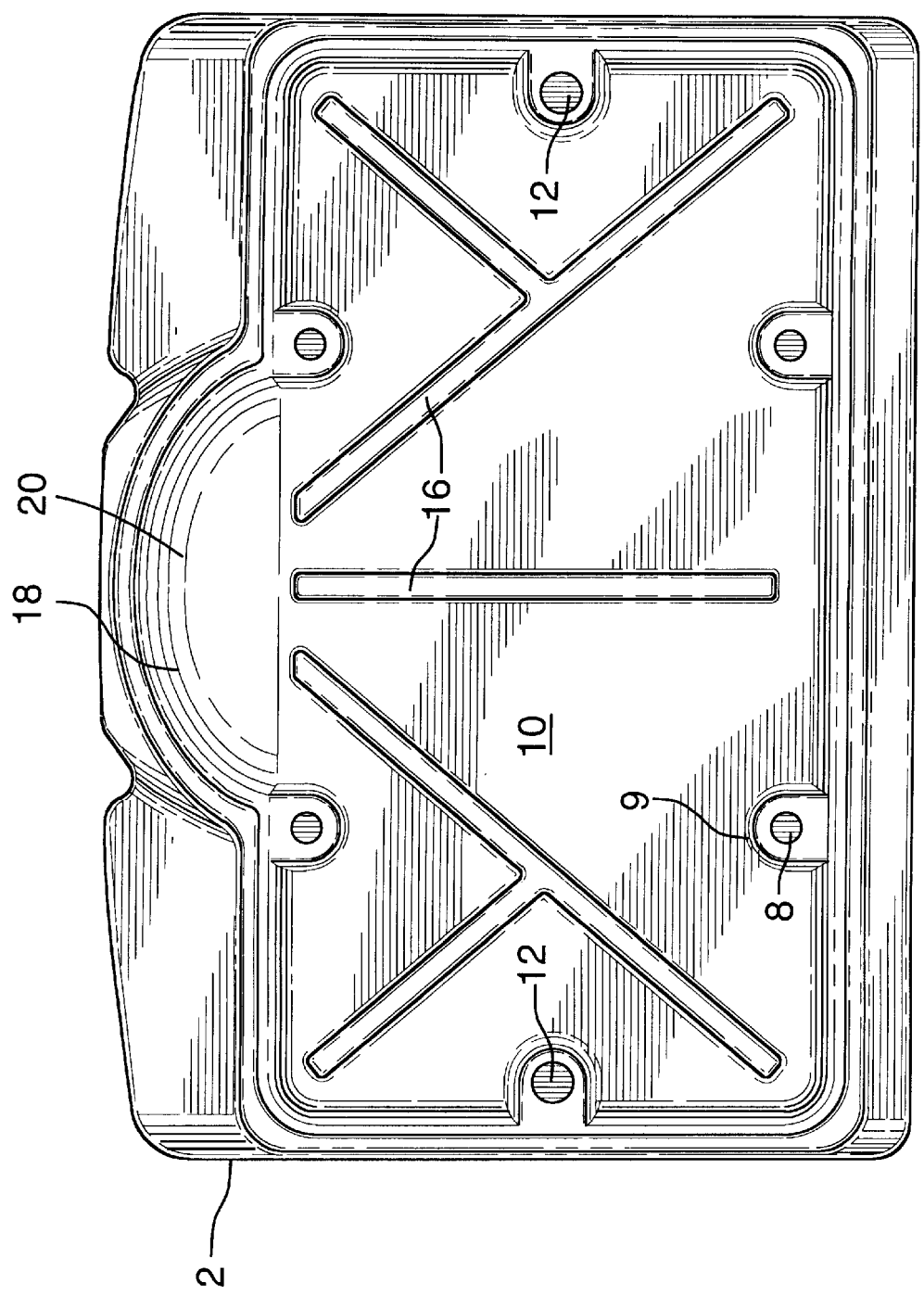
FIG. 3 is a plan view of the preferred embodiment.
Figure 4:
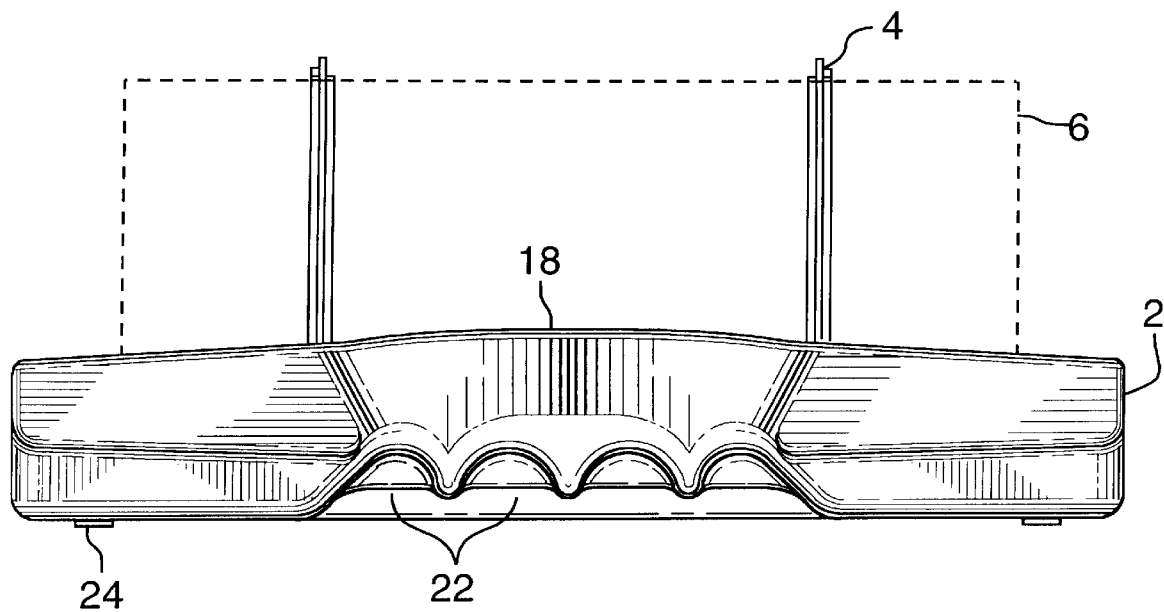
FIG. 4 is a rear elevation view of the preferred embodiment.
Figure 5:
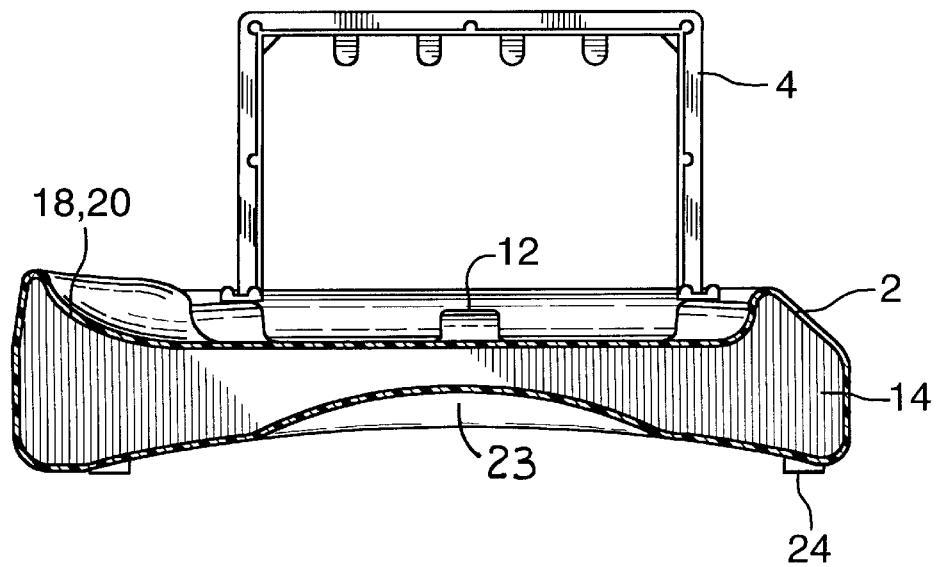
FIG. 5 is a side cross-sectional view of the preferred embodiment.
Figure 6:
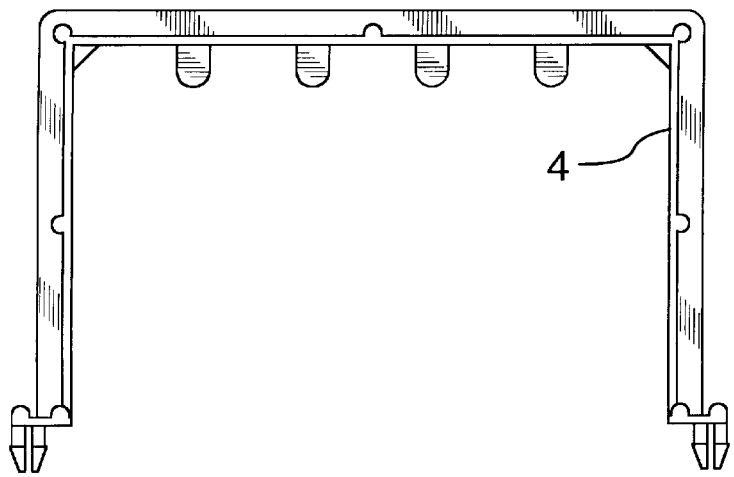
FIGS. 6–8 are front, top and side views respectively of the hold-down clip.
Figure 8:
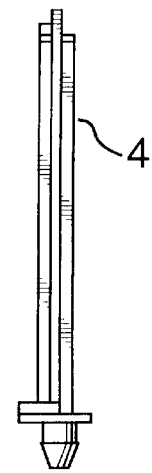
Figure 7:
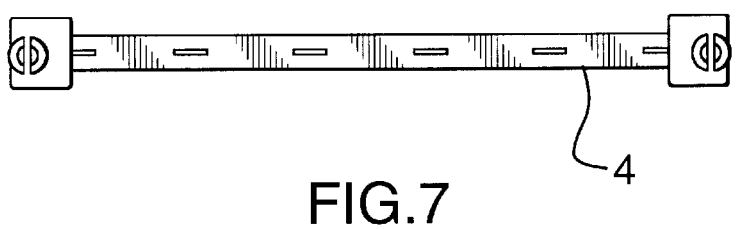
Figure 9:
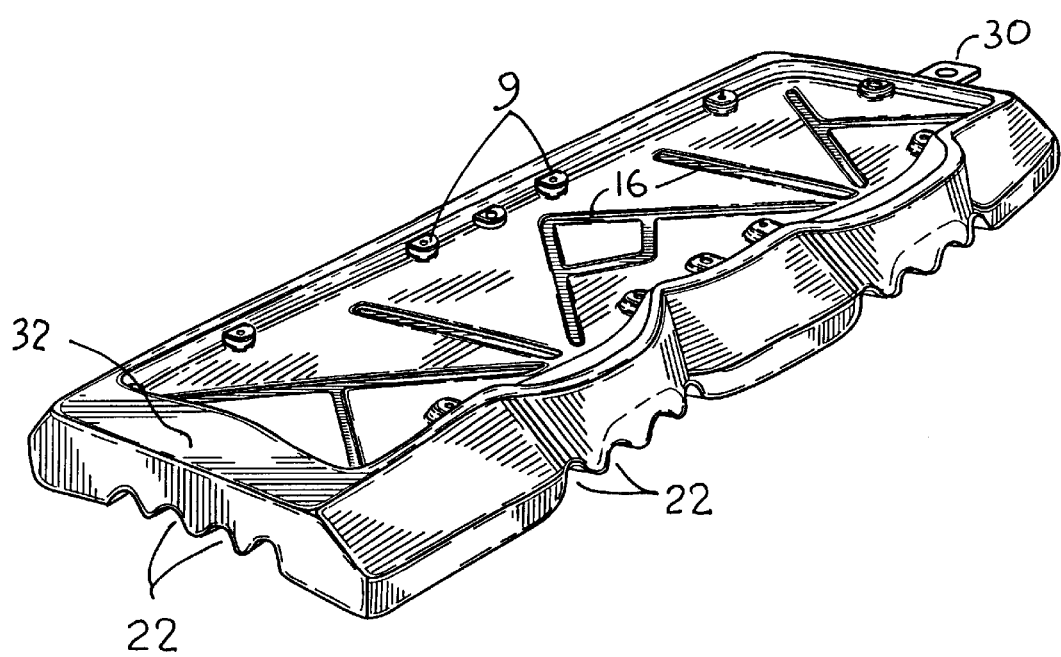
FIG. 9 is a perspective view of an elongated version of the invention.
Figure 10:
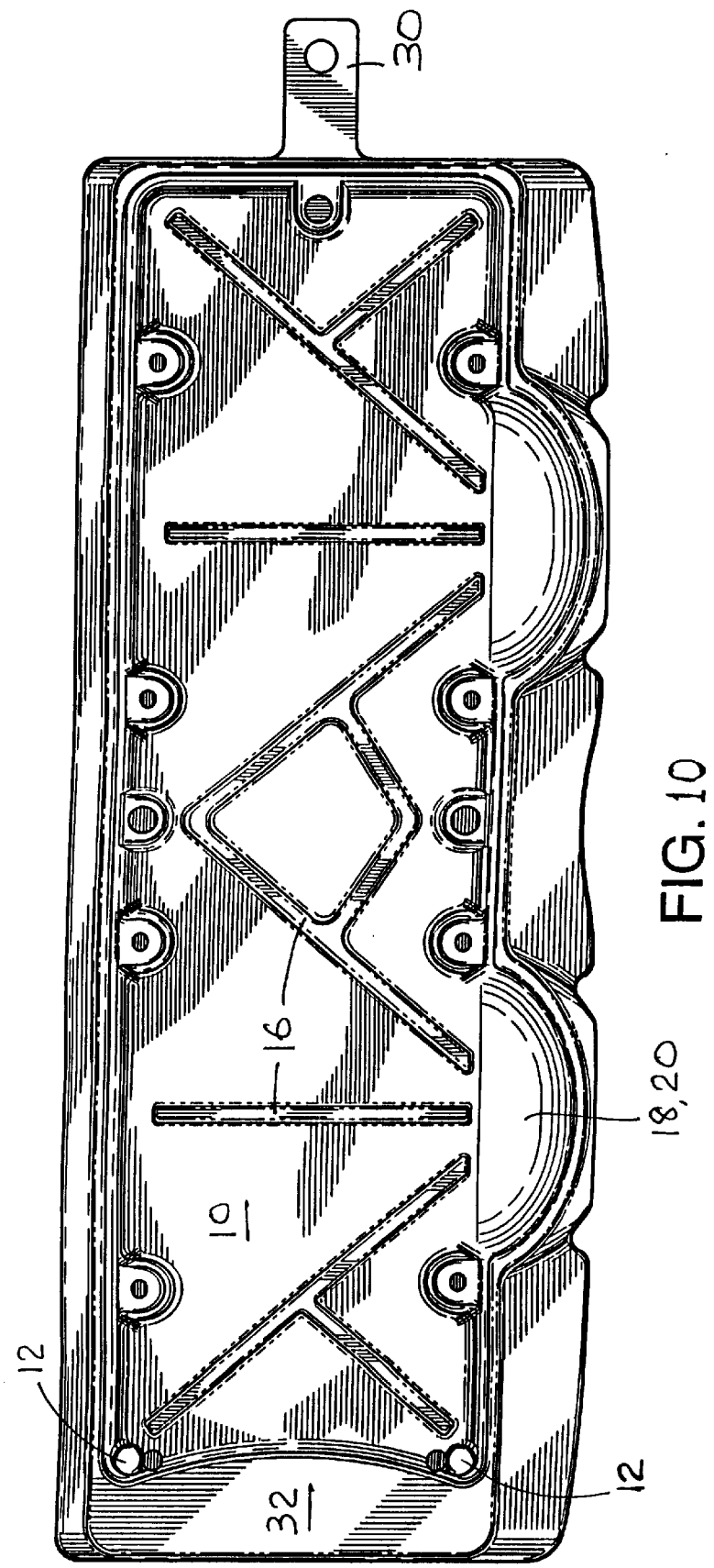
FIG. 10 is a plan view of the FIG. 9 embodiment.
Figure 11:
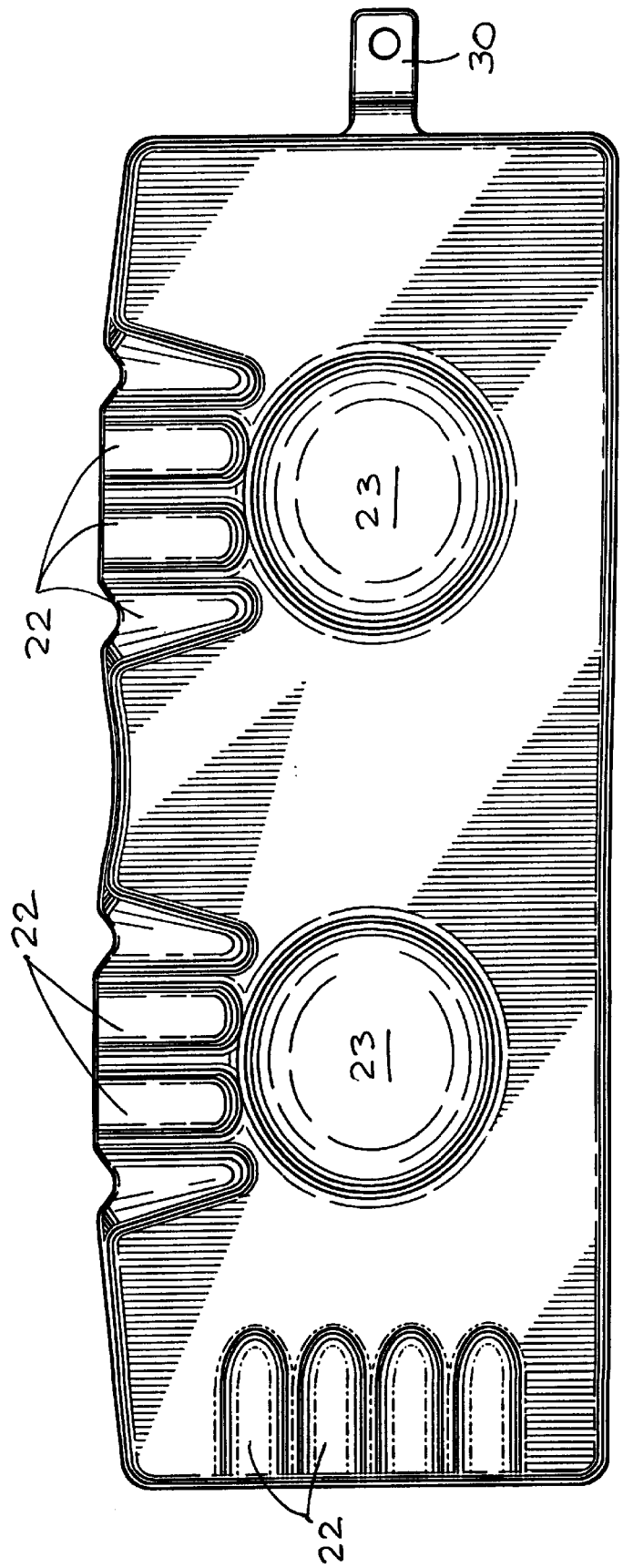
FIG. 11 is a bottom view of the FIG. 9 embodiment.

The preferred embodiment of the holder 1 includes a hollow base 2 and two hold-down clips 4 to retain a foam block 6. The foam block is normally soaked in water prior to positioning on the base. The hold-down clips snap into holes 8 in the base. Six raised projections 9 also serve to help to retain the foam block, since the block must be press-fitted within the projections.

There are no ribs or ridges on the upper surface of the base, so that the foam block is in contact with the upper surface 10 of the base. Drain holes 12 are provided so that any excess water can run into the hollow interior 14 of the base, thus avoiding the alleged potential spillage problem of Smithers. These drain holes may be as illustrated, or may be positioned anywhere on the upper surface, such as preferably in the corners. Furthermore, recessed reservoir channels 16 are provided in the upper surface of the base, to allow any excess water in one portion of the block to flow to a drier portion, and to allow water to wick upwardly into the block from the channels.

Also, a filling area 18 is provided. The filling area extends outwardly from the base for convenient access, and has an upper surface 20 which preferably is angled slightly downwardly towards the channels 16 for better distribution of the water. The channels communicate directly with the area at the bottom of the downwardly-angled portion, so that water can run directly from the filling area into the channels, for better water distribution. This filling area makes it very easy for water to be added from time to time, with much less risk of spillage than in the prior art.

The filling area also doubles as a convenient hand grip. Thus preferably the underside of the filling area is provided with four finger recesses 22, so that a person can conveniently grasp the unit with his or her thumb on top of the filling area, and four fingers in the finger recesses.

On the underside of the base, there is preferably a domed portion 23 for improved strength, and there are preferably four rubber feet 24, to support the unit and to resist slipping. Preferably, the base is blow-molded. The feet are inserted in the mold first, then the mold is closed, and then the plastic is blown, capturing the feet in the process.

Figure 12:
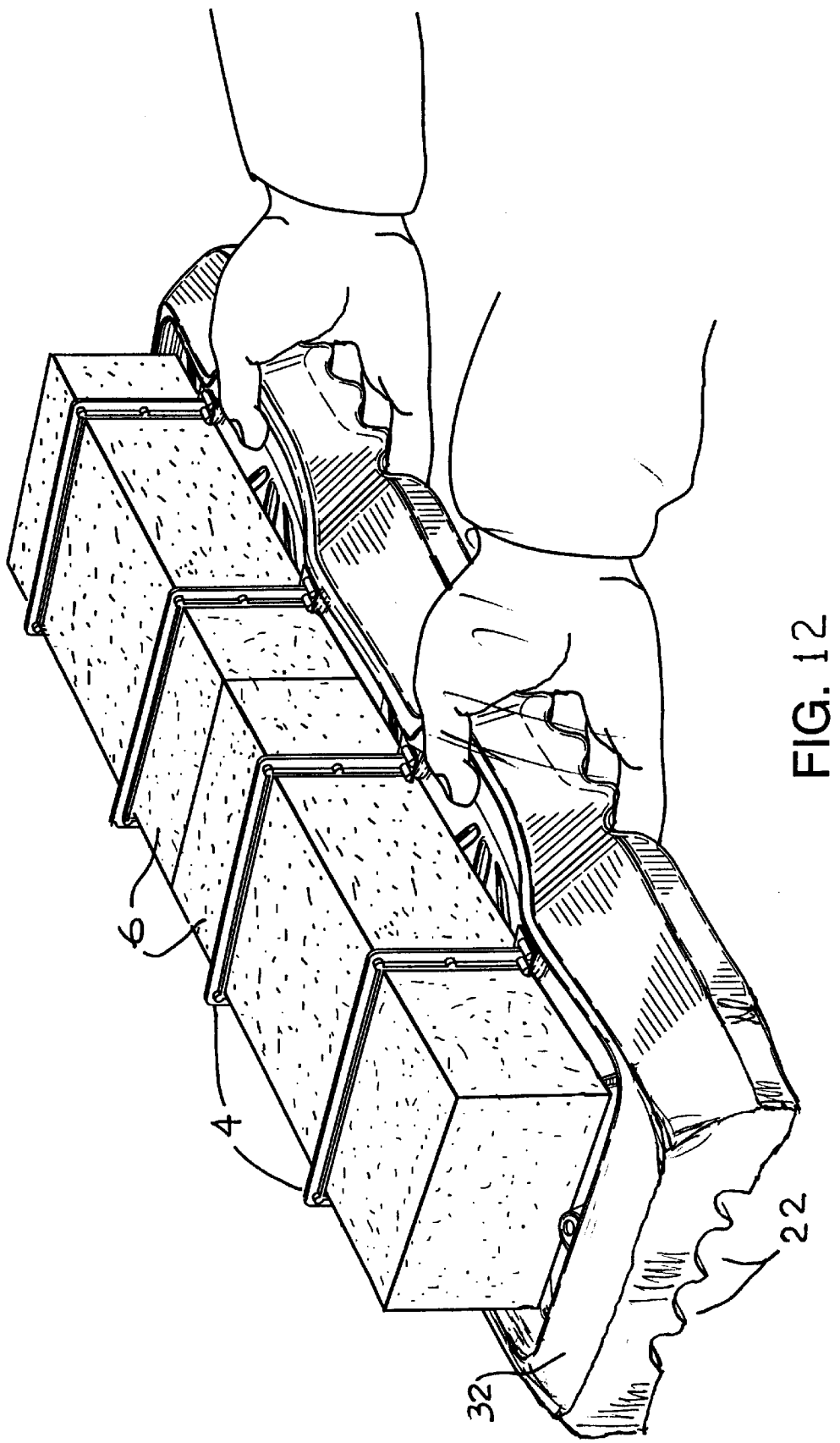
FIG. 12 is a perspective view of the FIG. 9 embodiment, with two foam blocks.

FIGS. 9–12 show an expanded "double" version of the invention, configured very similarly to the embodiment of FIGS. 1–5, but adapted to hold two foam blocks 6, as seen in FIG. 12. Two sets of finger recesses 22 are provided along the length of the unit, and preferably a set of finger recesses is also provided at at least one end.

Preferably, the embodiment of FIGS. 9–12 also has an apertured tab portion 30, to enable the unit to be suspended if desired, although preferably not vertically since some spillage might occur, although most excess water from the blocks would find its way into the base via drain holes 12. Preferably, the base has an extended portion 32 at the end opposite the apertured tab, to provide an extra waterstorage capacity, particularly useful when the unit is suspended.

What is claimed is:

1. A holder for receiving and retaining a foam block used to support floral arrangements, said holder comprising:

a hollow base having a water retaining outer shell portion extending upwardly to a top lip and a water retaining inner support portion interiorly mounted within said outer shell portion and together defining a substantially hollow interior therebetween, with said inner support portion having an upper surface shaped to receive said foam block in supporting relation below said top lip of said outer shell portion so as to permit retention of water on said upper surface;

retaining means mounted on said hollow base for holding a foam block in place on said upper surface;

at least one drain hole communicating between the hollow interior of said base and the upper surface thereof; and, at least one elongated water retaining recessed reservoir channel disposed in said upper surface for permitting water to flow to a substantial portion of a foam block when in place on said upper surface.

2. The holder of claim 1, further comprising a filling area extending outwardly at a portion of said top lip of said outer shell portion.

3. The holder of claim 2, wherein a portion of said at least one recessed reservoir channel is disposed adjacent said filling area.

4. The holder of claim 3, wherein said at least one recessed reservoir channel comprises a plurality of recessed reservoir channels.

5. The holder of claim 4, wherein said plurality of recessed reservoir channels converge at said said filling area.

6. The holder of claim 5, wherein said base has a plurality of finger recesses in its underside.

7. The holder of claim 6, wherein said plurality of finger recesses are disposed substantially directly below said filling area.

8. The holder of claim 7, further comprising a plurality of raised projections disposed around the perimeter of said upper surface such that a foam block supported on said upper surface is retained laterally in place by said plurality of raised projections.

9. The holder of claim 8, wherein at least one of said plurality of raised projections has a drain hole disposed therein.

10. The holder of claim 9, wherein said base and said upper surface are each substantially rectangular so as to receive two rectangular foam blocks in end-to-end fashion, said base including an extended portion at one end thereof to provide increased water-storage capacity.

11. The holder of claim 10, further comprising an apertured tab extending from an end of said holder opposite said end with said extended portion.

12. The holder of claim 9, wherein said base and said upper surface are each substantially rectangular so as to receive a correspondingly rectangular foam block.

13. The holder of claim 12, wherein said plurality of raised projections comprises six raised projections dispersed one at each end and two at each side of said upper surface.

14. The holder of claim 13, wherein the two raised projections disposed one at each end of said upper surface each have one of said drain holes disposed therein.

15. The holder of claim 14, wherein said plurality of recessed reservoir channels comprise a central transverse channel and two "Y"-shaped channels disposed one toward each end of said upper surface.

16. The holder of claim 15, wherein said retaining means comprises at least one inverted "U"-shaped hold-down clip mounted in removably securable relation to said base, for holding a foam block in place on said upper surface of said base.

17. The holder of claim 16, wherein said at least one inverted "U"-shaped hold-down clip comprises two inverted "U"-shaped hold-down clips.

18. The holder of claim 17, wherein each of said two inverted "U"-shaped hold-down clips has two bifurcated mounting posts disposed one at each end of the respective clip, each bifurcated mounting post being shaped and dimensioned for fitment into a co-operating hole in one of said raised projections.

* * * * *